(12) United States Patent
Hesse

(10) Patent No.: US 9,664,590 B2
(45) Date of Patent: May 30, 2017

(54) PROCESS AND DEVICE FOR THE TIGHTNESS CHECK OF A CONTAINER

(71) Applicant: IWK Verpackungstechnik GmbH, Stutensee (DE)

(72) Inventor: Fabian Hesse, Karlsruhe (DE)

(73) Assignee: IWK Verpackungstechnik GmbH, Stutensee (DE)

( * ) Notice: Subject to any disclaimer, the term of this patent is extended or adjusted under 35 U.S.C. 154(b) by 132 days.

(21) Appl. No.: 14/765,147

(22) PCT Filed: Feb. 4, 2014

(86) PCT No.: PCT/EP2014/000283
§ 371 (c)(1),
(2) Date: Jul. 31, 2015

(87) PCT Pub. No.: WO2014/127885
PCT Pub. Date: Aug. 28, 2014

(65) Prior Publication Data
US 2015/0362401 A1    Dec. 17, 2015

(30) Foreign Application Priority Data

Feb. 20, 2013    (DE) .................. 10 2013 002 856

(51) Int. Cl.
| | |
|---|---|
| *G01M 3/36* | (2006.01) |
| *B29L 23/20* | (2006.01) |
| *B29C 65/82* | (2006.01) |
| *B29C 65/00* | (2006.01) |
| *B29C 65/02* | (2006.01) |

(52) U.S. Cl.
CPC .............. *G01M 3/36* (2013.01); *G01M 3/363* (2013.01); *B29C 65/02* (2013.01); *B29C 65/82* (2013.01); *B29C 66/1122* (2013.01); *B29C 66/43123* (2013.01); *B29C 66/72321* (2013.01); *B29L 2023/20* (2013.01)

(58) Field of Classification Search
CPC ..... G01M 3/36; G01M 3/363; B29L 2023/20; B29C 66/43123; B29C 66/72321; B29C 65/82
USPC ................... 73/46, 49.2, 49.3, 49.8
See application file for complete search history.

(56) References Cited

U.S. PATENT DOCUMENTS

| | | | |
|---|---|---|---|
| 5,127,260 A | 7/1992 | Robertson | |
| 5,156,329 A | 10/1992 | Farrell | |

(Continued)

FOREIGN PATENT DOCUMENTS

| | | | |
|---|---|---|---|
| DE | 42 23 793 A1 | 1/1994 | |
| EP | 0 661 212 A1 | 7/1995 | |

(Continued)

*Primary Examiner* — Walter L Lindsay, Jr.
*Assistant Examiner* — Ruth Labombard
(74) *Attorney, Agent, or Firm* — McGlew and Tuttle, P.C.

(57) ABSTRACT

A container has a tube-like or tubular shell, which is sealed against the surrounding atmosphere and has a weld seam at at least one end. For checking the tightness of the container the internal pressure in an interior space of the container is increased by means of external action and the thereby ensuing deformation of the weld seam is detected. Provisions are made in this connection for the weld seam to be clamped between clamping elements before increasing the internal pressure only in a partial area of its surface, which has a distance from the end of the weld seam facing the interior space.

14 Claims, 3 Drawing Sheets

(56) References Cited

U.S. PATENT DOCUMENTS

| 5,507,177 A | 4/1996 | Focke |
|---|---|---|
| 2010/0116058 A1 | 5/2010 | Cheng |

FOREIGN PATENT DOCUMENTS

| GB | 2 055 736 A | 3/1981 |
|---|---|---|
| JP | H05-281 079 A | 10/1993 |
| JP | 2004-284 677 A | 10/2004 |

PROCESS AND DEVICE FOR THE TIGHTNESS CHECK OF A CONTAINER

CROSS REFERENCE TO RELATED APPLICATIONS

This application is a United States National Phase application of International Application PCT/EP2014/000283 filed Feb. 4, 2014 and claims the benefit of priority under 35 U.S.C. §119 of German patent application DE 10 2013 002 856.6 filed Feb. 20, 2013, the entire contents of which are incorporated herein by reference.

FIELD OF THE INVENTION

The present invention pertains to a process for the tightness check of a container, which has a tube-like or tubular shell, which is sealed against the surrounding atmosphere and has a weld seam at at least one end, whereby the internal pressure in an interior space of a container is increased by means of external action and the thereby ensuing deformation of the weld seam is detected.

Furthermore, the present invention pertains to a device for the tightness check of a corresponding container.

BACKGROUND OF THE INVENTION

The container may be, for example, a tube made of plastic or one made of its aluminum plastic laminate, which is usually sealed at its one end by means of a cover or a cap and by means of a weld seam running transversely or vertically to the longitudinal extension of the tube at its opposite end. However, the container may also be a bag consisting of plastic film or of the said laminate and in particular a so-called tube-like bag, which is sealed at its both opposite axial ends each via a weld seam running transversely to the longitudinal extension. By way of example, it shall be assumed below that the container is a tube; however, the present invention is not limited thereto.

Tubes are predominantly used for accommodating pasty products, for example, a cream, which the user presses out after opening a seal by means of applying an external force of pressure on the tube. When the weld seam sealing the tube at its rear end is leaky, the problem arises in this connection that the product likewise leaks out there in an undesired manner. In order to prevent this, it is known to monitor the process parameters precisely and to check the tubes for their tightness after the filling and sealing, since leaky tubes lead to high image damage and additional costs for the manufacturer on the market.

The tightness of a tube is usually tested randomly. For this, a sealed tube is removed from the tube-filling machine or filling process and an overpressure is applied by means of compressed air in the tube interior in a separate test station. For this purpose, the tube seal must be opened beforehand, as a result of which the tube is unsaleable and must be disposed of after the testing.

As an alternative, a force of pressure from outside is exerted on the tube wall and then it is detected whether the weld seam opens and the product leaks out. When the product leaks out, the test station must be cleaned. A corresponding cleaning is time-consuming and costly.

A fundamentally different process for the tightness check of a tube consists of introducing a test gas together with the product into the tube and locking it in same. It is subsequently detected by means of a test probe whether the test gas leaks out from the interior space of the tube. The costs of a corresponding device are very high as a result of the relatively expensive sensor mechanism and also as a result of the relatively large amount of test gas needed. In addition, the process works relatively slowly, such that the performance of a corresponding tube-filling machine is reduced. In case of sensitive and high-value products, it is frequently not desired to weld the test gas into the tube and thus to expose the product to the effect of the test gas. In addition, only the gas-tightness of the tube is checked in this way and it is not taken into consideration what stresses a user of the tube applies to same during use.

SUMMARY OF THE INVENTION

The basic object of the present invention is to create a process for the tightness check of a container and in particular of a tube, with which a leaky container is recognized with certainty and in which a leaking out of the product is prevented.

Furthermore, a device shall be created, with which the process can be carried out in a simple manner.

The object is accomplished with regard to the process with the features of the present invention. Provisions are made in this connection for the weld seam to be clamped in a rigid and sealing manner between clamping elements, for example, clamping jaws before increasing the internal pressure in a partial area of its surface, which has a distance from the end of the weld seam facing the interior space.

The present invention starts from the basic consideration of checking the tube for tightness as much as possible under conditions which come close to the intended use of the tube. For this reason, according to the present invention, a deformation is applied to the tube by external action, especially a force of pressure. When the tube has a defective or already leaky weld seam, the weld seam might open and the product might leak out at this opening. This is prevented by the weld seam being clamped before increasing the internal pressure. However, the clamping is not carried out over the entire surface of the weld seam, but only in a relatively small partial area of its surface, which is spaced apart from the end of the weld seam facing the interior space. In a defective weld seam, this weld seam will open or peel after the increase in the internal pressure at first at its end adjacent to the interior space, whereby the opening or peeling of the weld seam can, however, only take place up to the partial area of the weld seam held by the clamping elements. In this way, it is guaranteed by the clamping of the weld seam that even with a defective weld seam, no product can leak out and contaminate the surrounding area as a result of the increase in the internal pressure.

Depending on the properties of the product and in particular the viscosity of the product, it may be enough to clamp the weld seam only in partial areas of its length running transversely or vertically to the longitudinal extension of the tube. However, provisions are made for the weld seam to be clamped over its entire length in a preferred embodiment of the present invention.

So that a defective weld seam can open in case of an increase in the internal pressure, an area of the weld seam adjacent to the interior space of the tube must be free from the clamping elements or not clamped. The larger this free area is, the more easily can the deformation of opening of the weld seam be established. For this reason, in a variant of the present invention, provisions may be made for the weld seam to be clamped in its end area facing away from the interior space.

The deformation of the weld seam in case of an increase in the internal pressure can be detected by means of optical sensors, especially a camera. However, in a preferred embodiment of the present invention, provisions are made for the thickness of the weld seam in a cross section between the clamped partial area and the end of the weld seam facing the interior space to be detected and to be compared with a desired value. When a defective weld seam opens or peels with an increase in the internal pressure, the thickness of the weld seam increases sharply. This can be detected in a reliable manner. According to the present invention, distance measuring devices may be provided for this, which are arranged on opposite sides of the weld seam. Each distance measuring device, which may be, for example, a laser measuring device, measures the distance which the side of the weld seam facing it has from it. Since the distance of the distance measuring devices from each other is known, the thickness of the weld seam can be determined from the measured distance values. When this thickness is above a predetermined limit value, this suggests that the weld seam has opened in this cross section and thus is defective. A tube recognized as defective in this way is removed from the production process in a subsequent work station. It is possible in this way to check each tube and to guarantee that defective tubes are discarded.

The internal pressure in the interior space of the container is preferably increased by squeezing the container by means of an external force of pressure. A constant external force of pressure or an external force of pressure varying over time, for example, an increasing force of pressure can be applied here. In this connection, the internal pressure in the interior space of the container shall be increased to a value of at least 2 bar, i.e., it shall have an overpressure of approx. 1 bar compared with the surrounding atmosphere. Preferably, the internal pressure is at least 2.5 bar and especially at least 3.0 bar.

It was shown that an opening or a peeling of a defective weld seam possibly occurs only when the increased internal pressure acts over a relatively long duration of several seconds on the weld seam. Therefore, provisions may be made according to the present invention for the internal pressure to be increased in the interior space of the container for a duration of at least 10 sec. and especially for a duration of at least 20 sec. When a weld seam shows no deformation or no opening or peeling after these relatively long action times of the increased internal pressure, it can be assumed that the weld seam is ok.

When the parameters of the welding process, by means of which the weld seam is formed and the tube is sealed, are set in a defective manner, it may happen that the plastic material of the tube melts excessively during the welding process and the tube wall is destroyed. Such a deformed tube can usually be immediately recognized by its external shape, which deviates markedly from the outer shape of a normal tube. This deformed tube is usually already leaky, before an external force is applied. In this case, a correspondingly deformed tube should not be subjected to the tightness check explained here, since the product located in the tube might then leak out despite the clamping of the weld seam. For this reason, provisions may be made in a variant of the present invention for the outer shape of the container or of the tube to be at least partially detected by means of a sensor optical system and be compared with a desired shape before the increase in the internal pressure. When the outer shape of a tube deviates sharply from the usual desired shape of a tube, the tube is immediately removed from the process and discharged, such that this obviously defective tube is prevented from being subjected to further testing.

The sensor optical system can detect and check the outer shape of the entire tube; however, it is usually sufficient when the outer shape of the tube is detected only in the area of the weld seam and is compared with the desired shape of the weld seam.

In rare cases of exception, it may happen that the weld seam it not failed and deformed by applying an increased internal pressure in the interior space of the tube, but rather that the tube, at a different point of the tube, has a defective point, for example, a weak point or even a hole, at which the product leaks out. In order to detect and remove such tubes with certainty as well, provisions may be made in a variant of the present invention for the tube to be weighed in a work station arranged downstream, as a result of which a loss of filler or product and thus a leak can be found.

Regarding the device, the above-mentioned object is accomplished by providing a first clamping system, by means of which the weld seam can be clamped in a partial area of its surface, a second clamping system, by means of which an external force of pressure can be applied to the container for increasing the internal pressure in the interior space of the container, and a sensor device, by means of which the thickness of the weld seam can be detected. In this connection, the sensor device may comprise at least two distance measuring devices, which are arranged on opposite sides of the weld seam.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figures 1, 2:
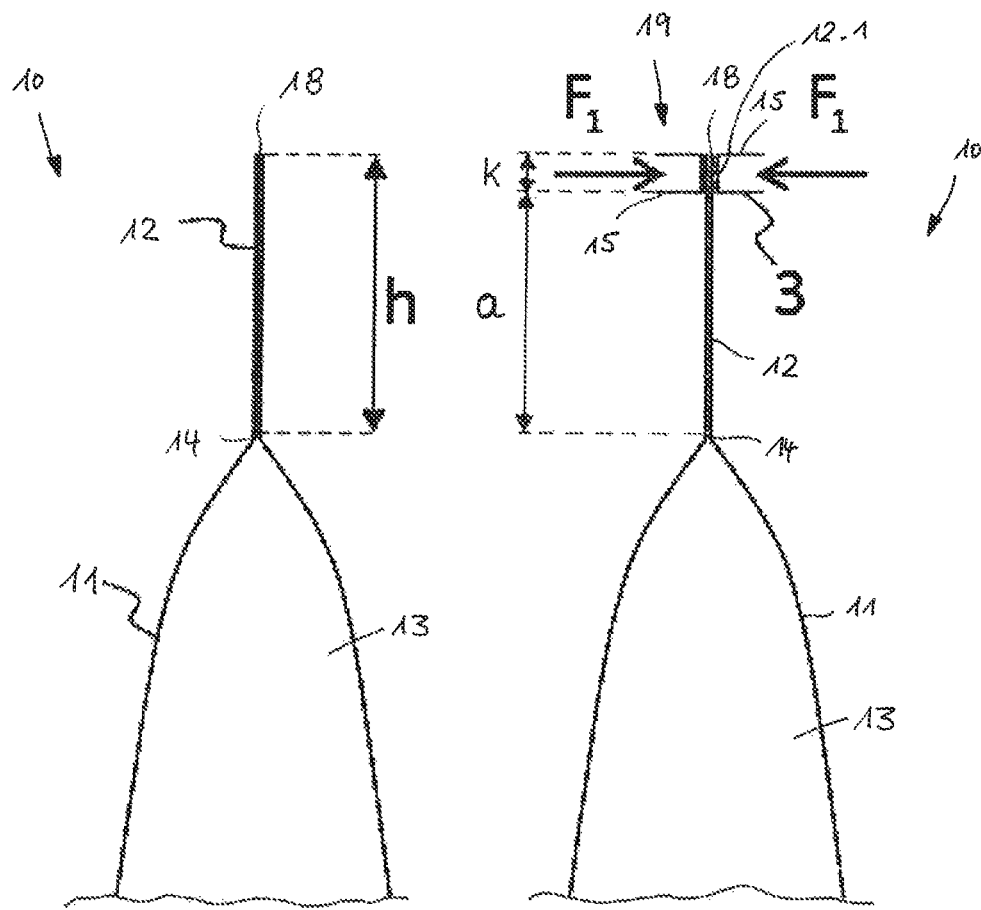
FIG. 1 is a cross sectional view through the upper area of a tube, including a weld seam before the beginning of a tightness check.
FIG. 2 is a cross sectional view corresponding to FIG. 1 after clamping the weld seam.

Referring to the drawings in particular, FIG. 1 shows a cross section of an upper area of a container 10 in the form of a tube, which has a shell 11 consisting of plastic, which encloses an interior space 13, whereby the shell 11 is sealed at its upper end via a weld seam 12 running vertically to the longitudinal extension of the tube 10 and vertically to the plane of the drawing. The weld seam 12 has a height h in the axial longitudinal direction of the tube 10 between its lower end 14 facing the interior space 13 and its upper end 18 facing away from the interior space 13. A product, not shown, for example, a cream is located in the interior space 13 of the tube 10.

In order to check the tube 10 for its tightness, the weld seam 12 is, according to FIG. 2, clamped in its end area 12.1 facing away from the interior space 13 between jaw-like clamping elements 15, which form a first clamping system 19, while applying an external clamping force $F_1$. It is essential here that a sufficiently free, unclamped area of the weld seam remains between the clamped area 12.1 and the end 14 of the weld seam 12 facing the interior space 13. In the exemplary embodiment shown, the weld seam 12 is clamped over a height k, while a height a of the weld seam 12 remains free, whereby a≥k. In particular, provisions are made for the height a of the free, unclamped area to be at least twice as large as the height k of the clamped area 12.1, i.e., a≥2k. As an alternative, however, provisions may also be made for the free height a of the weld seam 12 to be smaller than the height k of the clamped area 12.1, i.e., a≤k. Preferably: a≤k≤2a.

The jaw-like clamping elements 15 are pressed together with the force of pressure $F_1$ and clamp the area 12.1 of the weld seam 12 and over the entire length of the weld seam vertically to the plane of the drawing with certainty.

Figure 3:
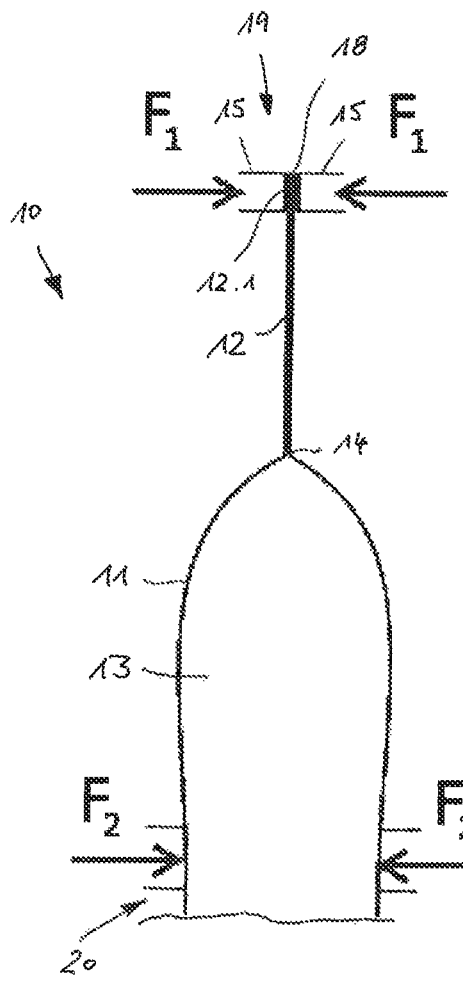
FIG. 3 is a cross sectional view corresponding to FIG. 2 after applying an external force of pressure.

In a subsequent process step, which is shown in FIG. 3, an external force of pressure $F_2$ is applied to the shell 11, defining the interior space 13, of at least two opposite sides by means of an only schematically indicated second clamping system 20, as a result of which the internal pressure in the interior space 13 of the tube 10 is increased to an absolute value of approx. 2 bar. This condition is shown in FIG. 3.

Figure 4:
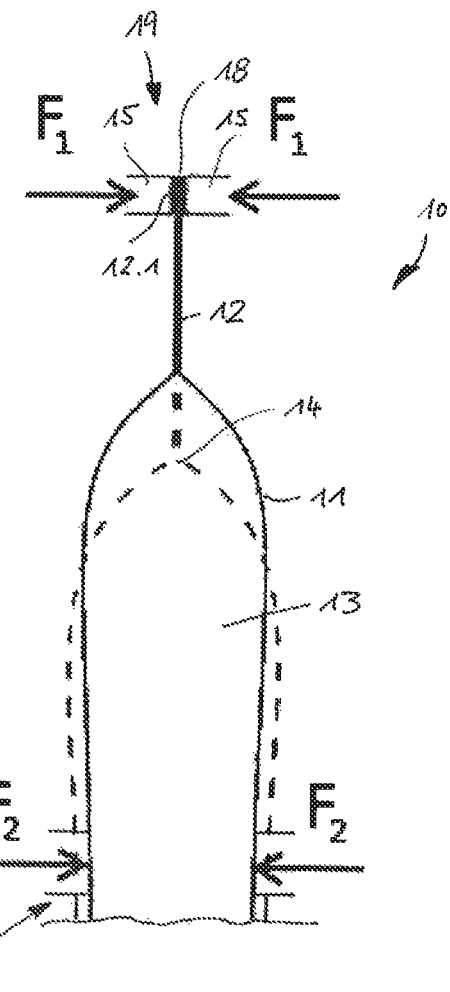
FIG. 4 is a cross sectional view corresponding to FIG. 3 at the beginning of the opening or peeling of the weld seam.

When the weld seam 12 is formed properly and tight, it retains its shape in spite of increasing the internal pressure, as it is shown in dotted line in FIG. 4. When the weld seam 12 is defective, it begins to open or peel at its lower end 14 facing the interior space 13, as it is shown in FIG. 4.

Figure 5:
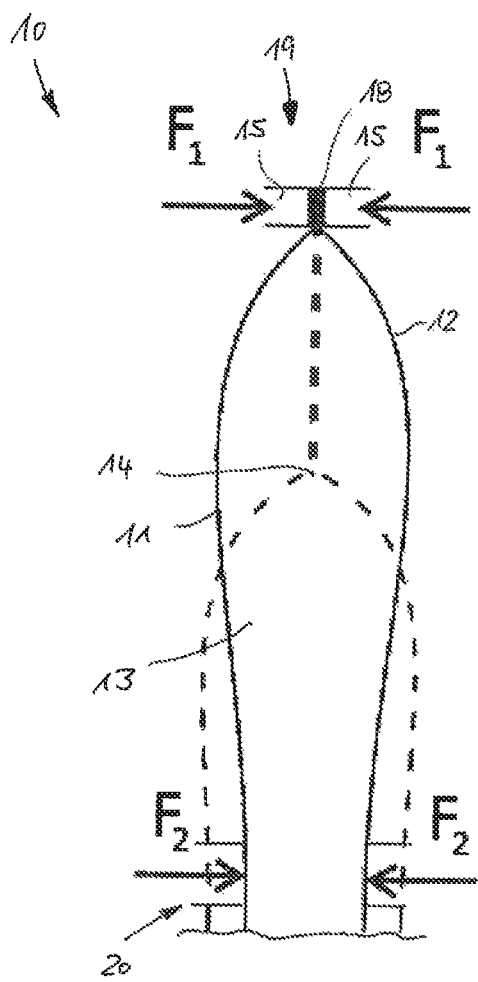
FIG. 5 is a cross sectional view corresponding to FIG. 4 with a weld seam open up to the clamping system.

The increase in the internal pressure in the interior space 13 by means of the external force of pressure $F_2$ is maintained for a relatively long duration of at least 10 sec. and especially 20 sec. This usually leads to the weld seam 12, when it is defective, opening completely up to the area 12.1 clamped between the clamping elements 15, as it is shown in FIG. 5.

Figure 6:
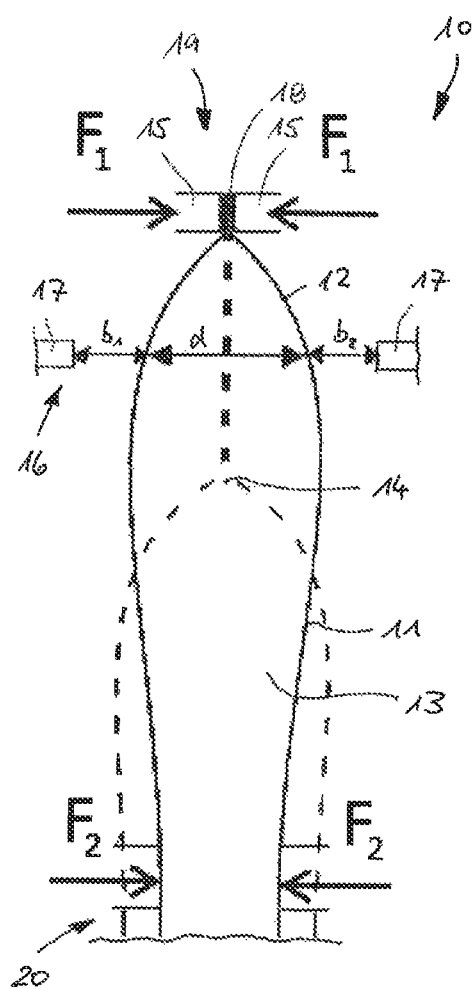
FIG. 6 is a cross sectional view corresponding to FIG. 5 in the determination of the seam thickness.

For detecting the deformation or the thickness d of the weld seam 12, a sensor device 16 is provided, which according to FIG. 6 has two distance measuring devices 17, especially in the form of laser measuring devices, arranged on opposite sides of the weld seam 12. Each distance measuring device 17 can measure the distance that the wall of the weld seam 12 has to the respective distance measuring device 17. The said distances are designated by $b_1$ and $b_2$ in FIG. 6. Since the distance of the distance measuring devices 17 to each other is known, the thickness d of the weld seam 12 that this weld seam has in the cross section measured by the distance measuring devices 17 can be determined in a simple manner. The thickness d of the weld seam 12 is compared with a desired value, and when it is determined that the measured thickness d of the weld seam 12 deviates from the desired value above a preset limit value, the tube is classified as defective and is eliminated in a subsequent step of the process.

While specific embodiments of the invention have been shown and described in detail to illustrate the application of the principles of the invention, it will be understood that the invention may be embodied otherwise without departing from such principles.

The invention claimed is:

1. A process for a tightness check of a container which has a tube-like or tubular shell which is sealed against a surrounding atmosphere and has a weld seam at at least one end, the process comprising:
increasing an internal pressure in an interior space of the container by external action and detecting ensuing deformation of the weld seam, wherein the weld seam is clamped between clamping elements before increasing the internal pressure only in a partial area of a surface of the weld seam, the surface having a distance from the end of the weld seam facing an interior space of the container.

2. A process in accordance with claim 1, wherein an entire length of the weld seam is clamped.

3. A process in accordance with claim 2, wherein an end area of the weld seam is clamped, said end area facing away from the interior space.

4. A process in accordance with claim 2, wherein a thickness of the weld seam in a cross section between the clamped partial area and the end of the weld seam facing the interior space is detected by means of at least one sensor device and the thickness is compared with a desired value.

5. A process in accordance with claim 1, wherein an end area of the weld seam is clamped, said end area facing away from the interior space.

6. A process in accordance with claim 5, wherein a thickness of the weld seam in a cross section between the clamped partial area and the end of the weld seam facing the interior space is detected by means of at least one sensor device and the thickness is compared with a desired value.

7. A process in accordance with claim 1, wherein a thickness of the weld seam in a cross section between the clamped partial area and the end of the weld seam facing the interior space is detected by means of at least one sensor device and the thickness is compared with a desired value.

8. A process in accordance with claim 7, wherein a distance measuring device is arranged on opposite sides of the weld seam, respectively.

9. A process in accordance with claim 1, wherein the internal pressure in the interior space of the container is increased by means of squeezing the container by means of an external force of pressure.

10. A process in accordance with claim 1, wherein the internal pressure in the interior space of the container is increased to an absolute value of at least 2 bar.

11. A process in accordance with claim 1, wherein the internal pressure in the interior space of the container is increased for a duration of at least 10 sec.

12. A process in accordance with claim 1, wherein an outer shape of the container before increasing the internal pressure is at least partially detected by means of a sensor optical system and the outer shape of the container is compared with a desired shape.

13. A device for a tightness check of a container, which has a tube-like or tubular shell which is sealed against a surrounding atmosphere and the container has a weld seam at at least one end, the device comprising:
a first clamping system, by means of which the weld seam can be clamped in a partial area of a surface of the weld seam;
a second clamping system, by means of which an external force of pressure can be applied to the container for increasing an internal pressure in an interior space of the containers; and
a sensor device, by means of which a thickness of the weld seam can be detected.

14. A device in accordance with claim 13, wherein the sensor device comprises at least two distance measuring devices, which are arranged on opposite sides of the weld seam.

* * * * *